Oct. 7, 1924.
C. F. SHERWOOD
SHAFT LINING
Filed June 23, 1921
1,510,804
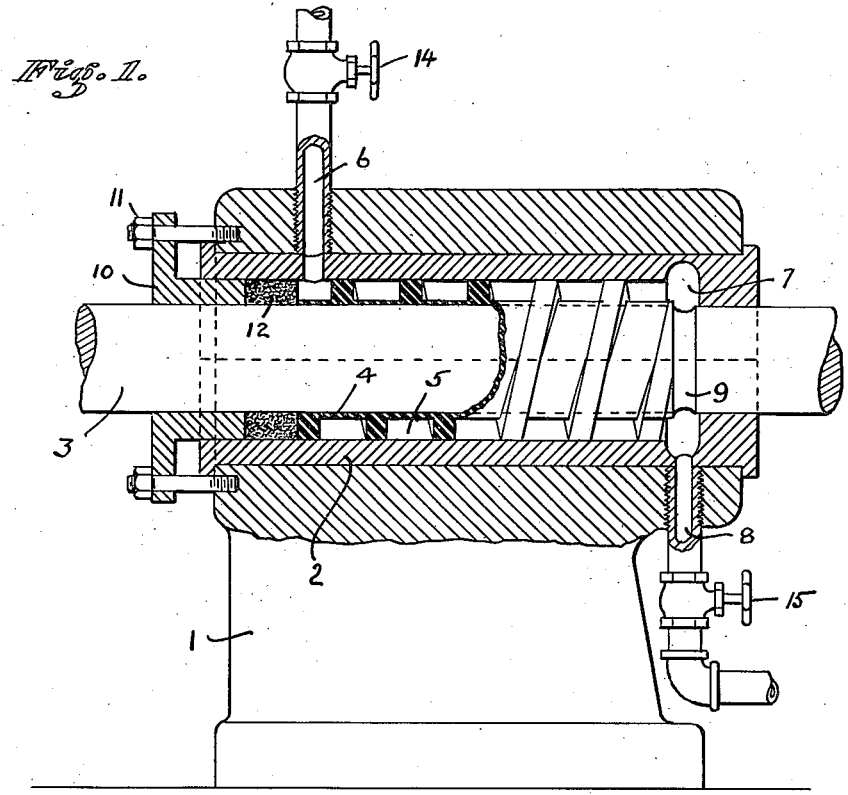
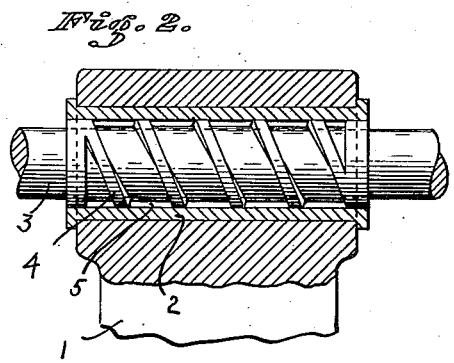
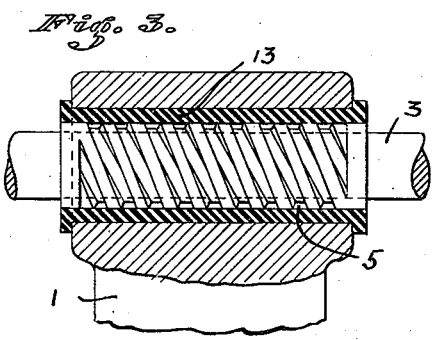
Inventor
Charles F. Sherwood
By A. W. Boyken
Attorney.

Patented Oct. 7, 1924.

1,510,804

UNITED STATES PATENT OFFICE.

CHARLES F. SHERWOOD, OF MILL VALLEY, CALIFORNIA.

SHAFT LINING.

Application filed June 23, 1921. Serial No. 479,719.

*To all whom it may concern:*

Be it known that I, CHARLES F. SHERWOOD, a citizen of the United States, residing at Mill Valley, Marin County, State of California, have invented new and useful Improvements in Shaft Linings, of which the following is a specification.

My invention relates to shafts or other rotating members adapted to be carried in bearings, and has for its principal object the protection and lubrication of such shaft especially in wet locations.

A further object is the economy resulting from its use in that my rubber bushing on the shaft journal is most easily and cheaply applied or removed or renewed.

Reference is made to my two co-pending applications Serial No. 360,702, filed Feb. 24, 1920, and Serial No. 360,703 filed February 24, 1920. In these applications I show a rubber or elastic bearing which supports a rotating shaft and in which the bearing surface may have a spiral or other grooving on its surface suitable for conveying lubricant through the bearing so that a lubricant film is established and maintained between the shaft journal and the bearing surface.

In my present invention, the rubber or other yielding surface is shown on the movable shaft instead of on the stationary bearing, and which bearing may be the ordinary form of metal or may be of rubber as shown in my co-pending applications.

In my present invention rubber or other elastic or yielding material may be used as a shaft lining, and when so used has the advantage of equalizing the support over the entire length of the shaft within the bearing, because of the flexibility of the rubber. Other advantages are pointed out in my co-pending applications above referred to.

By placing a rubber lining over the shaft or otherwise sheathing the shaft with a rubber surface, and providing a spiral or other channel for passing lubricant through or across the journal surface, a forcing or pumping action is thereby set up when the shaft is rotated, which results in a forced circulation of the lubricant and the maintenance of lubrication at all times. Furthermore, with every revolution of the shaft the entire bearing surface is wetted, and a lubricant film will be constantly maintained between the rubber shaft face and the bearing surface. By providing rubber on the shaft surface, a minimum of wear is secured and a freedom from friction because of the relatively long life of rubber. Sand or grit will not embed itself in my rubber lined shaft as readily as in a metallic shaft surface, and thus I prevent cutting and scoring of the bearing.

In the drawings:

Figure 1 is a part section and part view of a bearing pedestal, in which the shaft is shown provided with a rubber bushing or lining, and having a spiral projection of rubber for contacting with the bearing and showing an inlet and outlet for water or other fluid serving as a lubricant.

Fig. 2 is a section of a bearing with the shaft having my invention applied, these are shown in view, the bearing in this case being of metal.

Fig. 3 is similar to Fig. 2 except the bearing is shown as of rubber.

Throughout the figures similar numerals refer to identical parts.

A pedestal is represented by 1 within which is mounted a bearing shell 2 which may be the well known metal sleeve or may advantageously be made of rubber as described below. Within this sleeve the shaft 3 is adapted to rotate, said shaft having a rubber or other elastic surface lining 4 forming a journal and vulcanized or otherwise affixed thereto. The surface of the journal is provided preferably with a spiral channel 5 extending the length of the bearing and which channel is adapted to convey lubricant which may enter the channel through the inlet pipe 6 and be discharged at the annular well 7 and thence through the discharge pipe 8. If desired a groove 9 may be cut in the shaft to provide interruption in the surface so as to secure the discharge of the lubricant into the well 7 by centrifugal force.

Instead of a spiral channel 5 on the surface of the journal a tortuous passage, or any other form of grooving may be provided on the rubber surface of the shaft, or the said journal surface may be in the form of a collection of studs or projections around which the lubricant is adapted to flow. The essence of the invention is the elastic surface of the shaft journal channeled for lubricant and this desired result may be accomplished in a variety of forms.

A packing gland of any well known form may be provided if necessary, at 10 which upon tightening the nut 11 will compress the packing material 12 and thus prevent leakage. The lubricant which enters the channel 5 may be under pressure or supplied in a variety of ways, and will then travel in the channel 5 lubricating the running joint between the journal and the bearing. If this channel be of spiral form, a pumping action will be set up by the rotating shaft, resulting in a forced circulation of the lubricant through the spiral channel and the rate of flow may be controlled by manipulating valves as 14 or 15 on the supply and discharge pipes.

In Figure 2 I have shown a form without supply and discharge pipes, this form being particularly adapted to water apparatus as pump turbines and the like, wherein the fluid employed in the apparatus may readily be employed as the lubricant finding its way from the casing into the joint between the bearing and journal and thence along the grooving of the journal surface.

In Figure 3 is shown a modification wherein the bearing surface is of rubber at 13 as well as the journal bushing or sheathing and which form I have found particularly advantageous for said pumps and the like, and in some instances for corrosive solutions.

I claim:

1. In combination with a shaft, a bushing of elastic material forming a journal on said shaft and adapted to rotate within a bearing.

2. In combination with a shaft, a bushing of rubber fixed to said shaft and forming a journal constructed and adapted to rotate within a bearing.

3. A shaft and journal as set forth in claim 1, wherein the surface of the journal bushing is grooved for the passage of lubricant.

4. A shaft and journal as set forth in claim 2, wherein the surface of the journal bushing is grooved for the passage of lubricant.

5. A shaft and journal as set forth in claim 1 wherein said journal surface is provided with a spiral groove adapted to pass fluid lubricant therethrough.

6. A shaft and journal as set forth in claim 2, wherein said journal surface is provided with a spiral groove adapted to pass fluid lubricant therethrough.

7. In combination with a shaft and a bearing adapted to support said shaft, an elastic sleeve fixed on said shaft and adapted to rotate in said bearing.

8. In combination with a shaft and a bearing adapted to support said shaft, an elastic sleeve fixed on said shaft and adapted to rotate in said bearing, and surface indentations in said sleeve forming a tortuous passage adapted to admit lubricant between said sleeve and said bearing.

9. In combination with a shaft and a bearing adapted to support said shaft, an elastic sleeve fixed on said shaft and adapted to rotate in said bearing, and a spiral groove in said sleeve to pass lubricant to the running joint between the sleeve and the bearing.

10. In combination with a shaft and a bearing adapted to support said shaft, a rubber sleeve fixed on said shaft and adapted to rotate in said bearing.

11. In combination with a shaft and a bearing adapted to support said shaft, a rubber sleeve fixed on said shaft and adapted to rotate in said bearing, and surface indentations in said sleeve forming a tortuous passage adapted to admit lubricant between said sleeve and said bearing.

12. In combination with a shaft and a bearing adapted to support said shaft, a rubber sleeve fixed on said shaft and adapted to rotate in said bearing, and a spiral groove in said sleeve to pass lubricant to the running joint between the sleeve and the bearing.

CHARLES F. SHERWOOD.